United States Patent [19]

Robertson

[11] Patent Number: 5,547,448
[45] Date of Patent: Aug. 20, 1996

[54] JOURNAL EQUIPPED ROTATIONAL DEVICES AND METHODS OF MAKING AND BALANCING THE SAME

[75] Inventor: Grant W. Robertson, 202 Claremont La., Downingtown, Pa. 19335

[73] Assignee: Grant W. Robertson, Lancashire, England

[21] Appl. No.: 144,864

[22] Filed: Oct. 28, 1993

[51] Int. Cl.$^6$ .................................................. B21B 31/08
[52] U.S. Cl. .............................. 492/16; 492/45; 492/47
[58] Field of Search ................................ 492/45, 47, 54, 492/16

[56] References Cited

U.S. PATENT DOCUMENTS

| | | | |
|---|---|---|---|
| 26,387 | 12/1850 | Van Deventer . | |
| 1,934,616 | 11/1933 | Steindorf | 492/47 |
| 1,948,430 | 2/1934 | Robinson | 492/47 |
| 2,543,507 | 2/1951 | Rancourt | 492/47 |
| 2,727,280 | 12/1955 | Waite | 492/45 |
| 2,814,855 | 12/1957 | Seary et al. | 492/47 |
| 2,818,742 | 1/1958 | Veach | 492/47 |
| 2,918,867 | 12/1959 | Killary et al. . | |
| 3,460,221 | 8/1969 | Korsch | 492/45 |
| 3,805,550 | 4/1974 | Patton . | |
| 4,081,320 | 3/1978 | Wahren et al. . | |
| 4,110,156 | 8/1978 | Stotz et al. . | |
| 4,686,004 | 8/1987 | Fujiwara . | |
| 4,812,209 | 3/1989 | Kinzler et al. . | |
| 4,920,627 | 5/1990 | Aikins et al. . | |
| 5,040,398 | 8/1991 | Nakagawa et al. | 492/47 |
| 5,072,497 | 12/1991 | Zaorabek et al. | 492/47 |
| 5,177,867 | 1/1993 | Danielsson . | |

FOREIGN PATENT DOCUMENTS

| | | | |
|---|---|---|---|
| 0377365 | 5/1919 | Germany | 492/45 |
| 0000610 | of 1910 | United Kingdom | 492/45 |

OTHER PUBLICATIONS

K. H. Schminke, "Die Bedeutung des Auswuchtens bei schnellaufenden Papiermaschinen", (6 pp.), Reprinted from *DAS PAPIER*, 45. Jahrgang, Jul. 1991 (w/English translation, 10 pp.).

SKF/General Catalogue, Carl Gerber GmbH, 1989, pp. Cover, inside cover, 872–875, 882–883, 908–909 and 918–921.

*Primary Examiner*—Irene Cuda
*Assistant Examiner*—Marc W. Butler
*Attorney, Agent, or Firm*—Panitch, Schwarze Jacobs & Nadel, P.C.

[57] ABSTRACT

A rotational device such as an industrial roll includes a rotational body such as a roll body and at least one journal member in the form of a stub shaft removably mounted and terminating within a journal opening provided in an end of the body. Engaged threaded portions provided in the journal opening and on the journal member prevent withdrawal of the journal member from the journal opening or separation of the abutting transverse stop surfaces on the journal member and in the journal opening. The journal opening includes a tapered portion and a tapered sleeve is interposed radially between the tapered portion of the journal opening and the journal member. A nut threaded onto the bearing member urges the tapered sleeve into engagement with the tapered portion of the journal opening further preventing relative rotational or transverse movement between the roll body and journal member. The abutting stop surfaces accurately position the bearing member axially with respect to the rotational body. The journal member is precision made and essentially dynamically balanced sufficiently by manufacture so as to not require separate dynamic balancing. The device is dynamically balanced as a whole on its journal member(s) and only the balance of the body is adjusted to bring the device into acceptable dynamic balance.

25 Claims, 3 Drawing Sheets

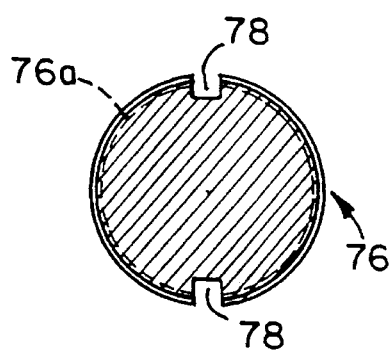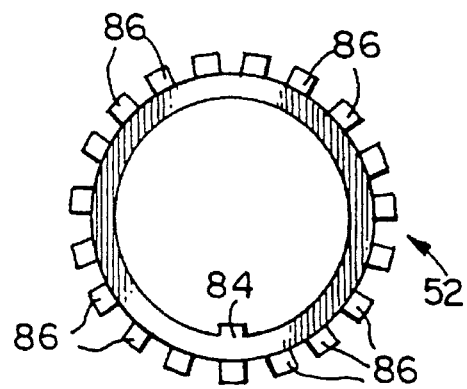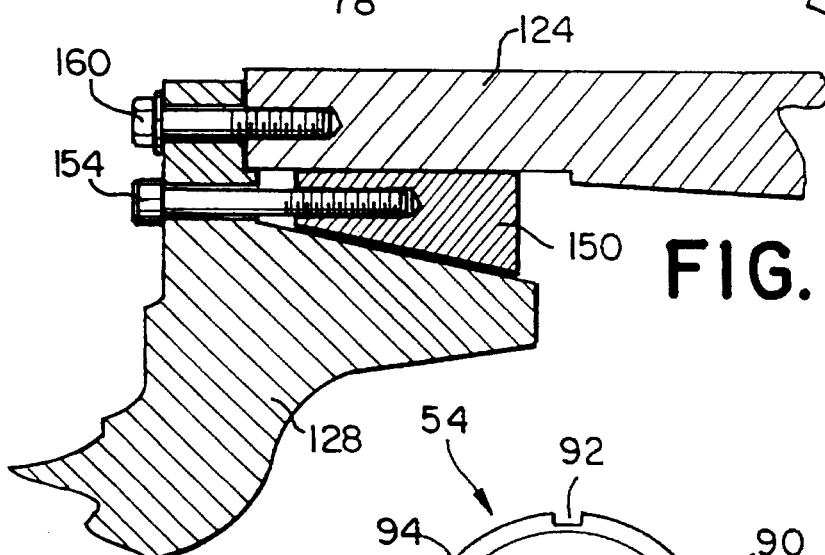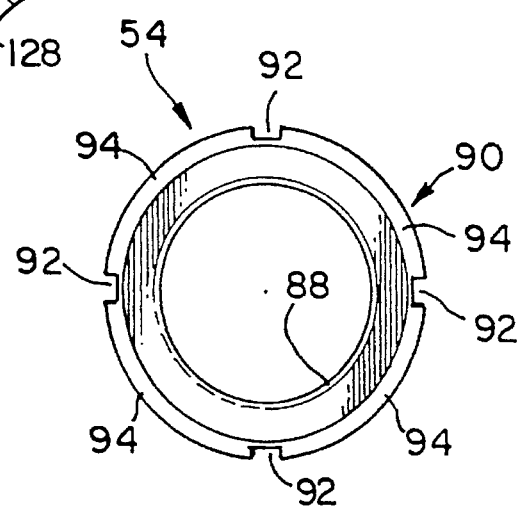

JOURNAL EQUIPPED ROTATIONAL DEVICES AND METHODS OF MAKING AND BALANCING THE SAME

FIELD OF THE INVENTION

The present invention relates to journal equipped rotational devices. More particularly, the present invention relates to industrial rolls and the like which are employed to process and/or convey stock material or goods or to drive conveyors.

BACKGROUND OF THE INVENTION

Rolls are widely employed in manufacturing and in materials handling to process and/or convey stock material or goods. For example, carrier rolls may be arranged to convey stock material or goods directly, as in a typical roll conveyor or may be arranged to drive a flexible support, such as a belt, web, or screen, which transports the stock material or goods, as in a typical belt conveyor. Nip, press and calendar rolls may be used to squeeze or to control the thickness or movement of a stock material.

In the paper making and non-woven fabric making industries, for example, carrier rolls are employed to transport webs of fibrous stock through the various stages of production and processing. The carrier rolls may be referred to as drive rolls, idler rolls, wire rolls, felt rolls, paper rolls, table rolls, blow rolls, head rolls, tail rolls, etc. In a known Fourdrinier paper making machine, a wire roll is utilized to drive a wire screen. The wire screen transports a fibrous web from a head box to a web transfer station. At the web transfer station, the fibrous web is transferred from the wire screen to a felt carrier. The felt carrier is driven by a felt roll and transports the fibrous web to a web drying station, where one or more dryer felt rolls is typically employed to transport the fibrous web through the drying station.

It is apparent to those skilled in the art that wear of the bearing surfaces on the journals becomes a significant concern. Excessive wear of the bearing surfaces may lead to wear-induced failure of the carrier roll. If failure occurs, then the entire manufacturing or conveying line must be stopped while the roll is removed for service or replacement.

It is essential that most industrial rolls be balanced to within a predetermined residual imbalance value for service. Balancing requires equipment that typically only roll manufacturers would have. Most conventional industrial rolls require rebalancing when a journal is repaired or replaced. This has typically necessitated returning a failed roll to the manufacturer for service. If a spare roll is not immediately available, the line can be incapacitated for days or even weeks awaiting a roll replacement.

Numerous assembly methods have been employed to fabricate the carrier rolls described above and other industrial rolls. One common method has been to fixedly install an axially elongated piece of cylindrical metal stock in each open axial end of a cylindrical metal body and machine an end of the stock which protrudes from the cylindrical metal body into a journal. Another method has been to install a machined journal shaft through an annular metal end head, and mount the end head, with the journal shaft, in an open axial end of the cylindrical metal body. Yet another method has been to assemble a tubular body and a pair of end heads into a roll body and thereafter mount a machined journal to each of the respective end heads. One version of this last method is described in U.S. Pat. No. 4,920,627, assigned to the assignee of the present invention and incorporated by reference herein.

Prior to the above referenced U.S. Pat. No. 4,920,627, rolls were balanced together with their journals as a single assembly without regard to the degree of imbalance of the roll body or the journal components. According to such prior methods, an assembled carrier roll would be supported on its journals and rotated in a dynamic balancing machine to determine the state of imbalance of the roll. Thereafter, conventional steps, such as the removal of metal from or the addition of metal to the roll would be performed to bring roll to within the desired predetermined residual imbalance value.

According to the method of the above referenced U.S. Pat. No. 4,920,627, a carrier roll was constructed by assembling individual, precision pre-balanced journals with a separate, pre-balanced roll body. Damaged journals could thereafter be removed and replaced with other, at least equally prebalanced journals. No further dynamic balancing of the assembled carrier roll was required to bring the roll back to within its prescribed residual imbalance value.

The use of individually prebalanced components as taught by U.S. Pat. No. 4,920,627 permits replacement of the journals without the necessity of rebalancing the entire roll. However, the rolls and methods used to make the rolls disclosed in U.S. Pat. No. 4,920,627 suffer from certain drawbacks. The rolls are more expensive to initially manufacture than conventional rolls by a significant fraction. The disclosed journal members have relatively large head flanges requiring that the journals be machined from constant diameter billets. A great deal of machining was required and a great deal of scrap metal was generated in their manufacture. Also, the flange end faces had to be machined square to the axis of rotation, which is a more difficult and time consuming process than simply symmetrically machining the axially extending circumferential surface of the billet. Also, the various roll components had to be prebalanced individually. The large transverse flanges of the journal members were a potential source of imbalance. Also, the roll bodies had to be prebalanced without their journal members, a more difficult operation than simply balancing a roll body on its journal members.

The rolls of U.S. Pat. No. 4,920,627 also have certain structural limitations. The large head flange tended to act as a stress concentrator in the journal, limiting the loads which the journal could support and thus the types of tube rolls and applications which could beneficially use the design. Also, the large head flange precluded use of the design in small diameter rolls. While the journal members were removable, the use of removal screws could result in damage to the facing surface of the roll body. This could cause a misalignment of the next mounted journal member resulting in a greater than expected or possibly allowed residual imbalance.

The predetermined residual imbalance value to which a carrier roll is balanced during or after assembly may be specified by a user when ordering the carrier roll from a manufacturer. That is, the user may specify permissible residual imbalance of the carrier roll in accordance with his specific needs and/or the conditions under which the carrier roll is to operate. Alternately, if the permissible residual imbalances are not specified, it has been the practice of the industry to balance carrier rolls to within a particular Balance Quality Grade. For example, the practice of the industry has been to prebalance carrier rolls for paper making lines to a G- 6.3 residual imbalance value, as defined in Acoustical Society of America Standard 2-75 for "Balance Quality of Rotating Rigid Bodies", incorporated by reference herein. This Standard has been approved by the American National Standards Institute as standard ANSI S2.19-1975, the entirety of which is also incorporated by reference herein.

It would be extremely desirable to provide a design for a method of constructing industrial rolls of the type which require prebalancing and which include removable, replaceable journals in which it is only necessary to assemble the roll and balance the roll once as a single assembly.

It would further be desirable to provide a design and method of industrial roll construction which permit the removal and/or replacement of journal without rebalancing of the roll and which do not suffer from some or all of the drawbacks of the roll design and methods disclosed in U.S. Pat. No. 4,920,627.

It would further be very desirable to provide a design and method of roll construction which enjoy at least the benefits of the roll constructed in accordance with U.S. Pat. No. 4,920,627 and which are less expensive to manufacture than are the rolls of the design of that patent.

It would further be extremely desirable to provide a design and method of constructing rolls with at least the benefits enjoyed by the rolls of U.S. Pat. No. 4,920,627 but having journals of greater strength and smaller overall size for greater applicability and use.

It would further be very desirable to provide a design and method of industrial roll construction which enjoy at least the benefits of the roll design and method of U.S. Pat. No. 4,920,627 but which avoid the necessity of a relatively large head flange and its consequent disadvantages.

SUMMARY OF THE INVENTION

In one aspect, the invention is an apparatus comprising a body at least generally symmetric about an axis of rotation that includes an axial end portion having a journal opening therein which extending along the axis of rotation and a journal stop surface. The journal opening defines an internal axially extending annular surface. A journal member is supported within the journal opening with one axial end of the journal member disposed in the roll body. The journal member includes a journal section and a bearing section. The journal section extends into the journal opening. The bearing section is disposed outwardly of the journal opening and extends axially away from the roll body. The journal section includes an outwardly extending stop surface abutting the journal stop surface of the roll body and an external, axially extending annular surface. At least one of the internal and external axially extending annular surfaces in the journal opening and on the journal member defines a substantially frustoconical journal surface. A substantially annular sleeve is interposed radially between the internal axially extending annular surface in the journal opening and the external axially extending annular surface on the journal section. The substantially annular sleeve includes at least one substantially frustoconical sleeve surface opposing the at least one substantially frustoconical journal surface. An urging member is mounted to one of the body and the journal member so as to urge the at least one substantially frustoconical sleeve surface into engagement with the at least one substantially frustoconical journal surface.

In another aspect, the present invention is an industrial roll which comprises a roll body including an end portion having an axially extending journal opening therein and a journal stop surface. The opening includes a frictional engagement portion, an interference engagement portion. A journal member is supported within the journal opening. The journal member includes a journal section extending into the journal opening and terminating within the roll body and a bearing section disposed outwardly of the journal opening and extending axially away from the roll body. The journal section comprises a frictional engagement journal portion received within the frictional engagement portion of the journal opening, a stop surface abutting the journal stop surface and an interference engagement portion in releasable interfering engagement with the interference engagement portion of the journal opening maintaining the abutment of the stop surfaces and preventing withdrawal of the journal member from the journal opening. A substantially annular sleeve is interposed between the frictional engagement portions of the journal opening and the journal member. The substantially annular sleeve comprises at least one substantially frustoconical circumferential sleeve surface engaging a substantially frustoconical surface provided on at least one of the frictional engagement portions of the journal opening and the journal member. An urging member is carried on the one of the roll body and the journal member urging the substantially frustoconical sleeve surface into engagement with the substantially frustoconical frictional engagement surface.

In yet another aspect, the invention is a method of connecting a journal member to an end of a rotational body. The journal member comprises a stub shaft including a bearing section and a journal section. The journal section includes a stop surface, and an interference engagement portion. The end of the body is provided with a journal opening which includes an interference engagement portion complementary to the interference engagement portion of the journal member and a journal stop surface. The method includes the steps of inserting the journal member into the journal opening in the rotational body end; releasably engaging the interference engagement portion of the journal member with the interference engagement portion of the journal opening so as to hold the stop surface on the journal member in abutment with the journal stop surface of the roll body, while preventing axial withdrawal of the journal member and securing the journal member from rotation with respect to the journal opening.

BRIEF DESCRIPTION OF THE DRAWINGS

The foregoing Summary of the Invention, as well as the following Detailed Description of the Preferred Embodiments, will be better understood when read in conjunction with the appended drawings. For the purposes of illustrating the invention, there is shown in the drawings an exemplary embodiment which is presently preferred. However, it is understood that this invention is not limited to the precise arrangements and instrumentalities shown.

In the drawings:

FIG. 3 is a cross-sectional view of the threaded collar section of the journal member, taken along lines 3—3 in FIG. 2;

FIG. 4 is an axial end view of a lock washer employed in the carrier roll;

FIG. 5 is an axial end view of the threaded nut; and

FIG. 6 depicts diagrammatically an alternate roll body construction for larger rolls.

DETAILED DESCRIPTION OF PREFERRED EMBODIMENTS

Figure 1:
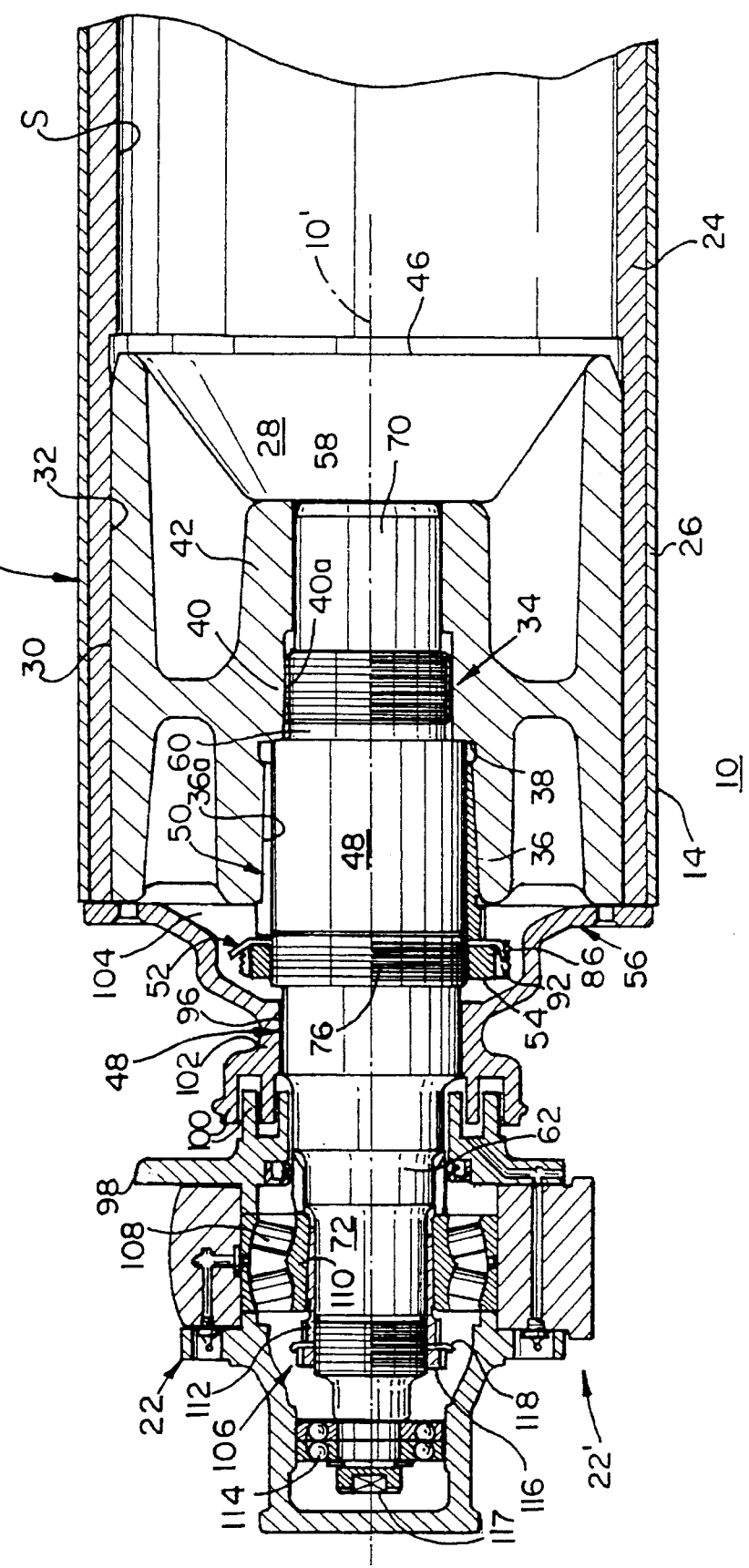
FIG. 1 is a partial cross-sectional view of one end of a carrier roll according to an embodiment of the invention.

Referring to the drawings, wherein like numerals are employed for the indication of like elements throughout, there is shown an exemplary preferred embodiment of a rotational apparatus or, more particularly, an industrial roll according to the invention, indicated generally at 10, in the form of a carrier roll, which might be used in a paper making machine. According to the preferred embodiment, roll 10 includes a rotational body or, more specifically, a roll body 12 having a pair of opposing axial ends, one of which is indicated a 14. A journal assembly 18 is connected to the axial end 14 of the roll body 12. The journal assembly 18 is, in turn, adapted to be supported by a bearing cartridge (e.g. shown in partial cross-section at 22). According to the preferred embodiment, the axial end 14 of the roll body 12 and the opposing axial end of the roll body are of identical mirror construction. Similarly, the journal assembly 18 and that at the opposing axial end of the roll 10 are of identical, mirror construction and are connected to the respective axial ends of the roll body 12 in an identical fashion. Accordingly and for the sake of brevity, the construction and connection details of the other axial end and its journal assembly will be omitted from the following description, it being understood that these details are, in the preferred embodiment, identical to the construction details of the axial end 14 and the journal assembly 18.

In the preferred embodiment 10, the roll body 12 includes a shell portion comprising a cylindrical shell 24 which may be surrounded by a cover 26. The cylindrical shell 24 is hollow and extends the entire axial length of the roll body 12. Preferably, the cylindrical shell 24 is made from drawn-over-mandrel steel tubing, centrifugally cast steel pipe, or other materials conventionally employed in the construction of shells for carrier rolls, but other materials conventional for other types of industrial rolls might be employed. The cover 26 constitutes the working surface of the roll 10 and is preferably made from rubber, glass fiber reinforced epoxy or other materials conventionally employed in the construction of "felt" covers for paper making carrier rolls. The cover 26 is preferably formed in-situ on the cylindrical shell 24, and conventional "pipe" threads (not shown) may be provided on the cylindrical shell 24 to aid in the curing of the cover 26.

At the axial end 14, the roll body 12 further includes an end portion preferably in the form of a separate end head 28 preferably having a machined outer peripheral surface 30. The outer peripheral surface 30 is preferably press fit or heat shrink fit within an internally machined section 32 of the cylindrical shell 24, thereby establishing a high degree of concentricity between the end head 28 and the cylindrical shell 24 which extends axially from the end head 28. Other assembly methods and configurations conventional for the industrial rolls or other rotational bodies in question also may be used. In the preferred embodiment 10, the end head 28 is preferably cast from steel, iron, or other materials conventionally employed in the construction of end heads for the subject carrier rolls.

Figure 2:
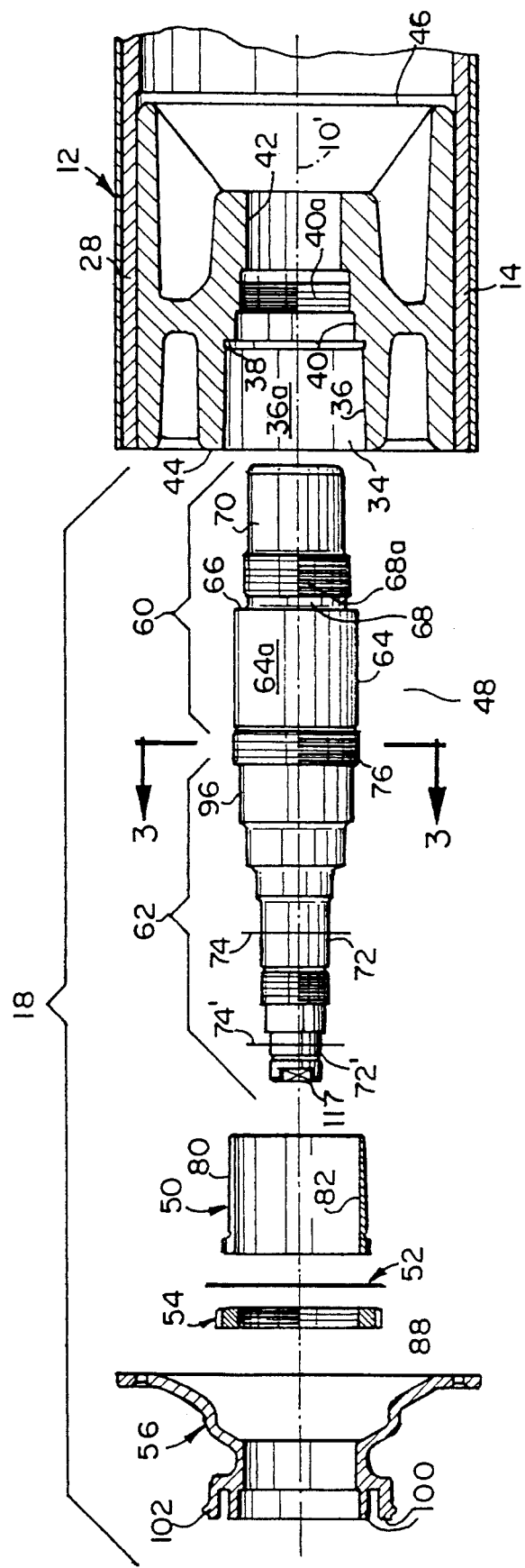
FIG. 2 is an exploded view, partially in cross-section, of the one end of the carrier roll in FIG. 1, showing the details of the end head and the journal assembly.

Referring now to FIG. 2, an axially extending journal opening 34 is preferably machined or otherwise provided in the axial end 14 of the roll body 12, within the end head 28, so as to extend completely therethrough and define an internal axially extending annular surface. The journal opening 34 is coaxial with a central longitudinal axis 10' of both the roll 10 and body 12 and extends from an outer axial side 44 of the end head 28 (e.g. defined relative to the roll body 12) entirely therethrough to an inner axial side 46 thereof and opening into a hollow interior of shell 24. In the preferred embodiment, the journal opening 34 includes for frictional engagement, a preferably tapered portion 36, a projecting stop surface preferably in the form of an annular shoulder 38, an interference engagement portion preferably in the form of an internally threaded portion 40, and a preferably cylindrical support portion 42 for supporting a journal. The tapered frictional engagement portion 36 is located adjacent to the outer axial side 44 of the end head 28 and defines an internal axially extending annular surface 36a which tapers radially inwardly as it extends in an axial direction towards the inner axial side 46 of the end head 28 to define an at least substantially frustoconical journal surface. The cylindrical support portion 42 is located adjacent to the inner axial side 46 of the end head 28. The internally threaded portion 40 is located axially between the tapered portion 36 and the cylindrical support portion 42, and the annular shoulder 38 is located axially between the tapered portion 36 and the internally threaded portion 40.

In the preferred embodiment, a minimum diameter of the tapered portion 36 is greater than a diameter of the internally threaded portion 40. Similarly, the axially innermost diameter of the internally threaded portion 40 is greater than a diameter of the cylindrical support portion 42. Accordingly, diametral steps are provided in the journal opening 34 between the tapered portion 36 and the internally threaded portion 40 and between the internally threaded portion 40 and the cylindrical support portion 42. The annular shoulder 38 is preferably formed as the diametral step between the tapered portion 36 and the internally threaded portion 40. However, the stop surface may be positioned elsewhere in the journal opening and even positioned externally from the opening on the transverse surface of the roll end 14.

According to the preferred embodiment of the invention, the journal assembly 18 comprises a journal member 48, a preferably substantially annular tapered sleeve 50, a lock washer 52, an "urging" member preferably in the form of a threaded nut 54, and a shroud 56.

The journal member 48 is preferably formed as and at least comprises a stub shaft which terminates within the roll body 12. That is, an axial end 58 of the journal member 48 is disposed within the roll body 12, preferably at a position inside the end head 28. In the preferred embodiment, the journal member 48 is preferably machined from high strength steel or other support material suitable for the loads and wear to be sustained. The journal member 48 includes a journal section indicated generally at 60, which extends into the journal opening 34, and a bearing section indicated generally at 62, which is disposed outwardly of the journal opening and which extends axially away from the roll body 12. By "disposed outwardly of", it is meant only that the bearing section 62 is exposed at the outer axial side 44 of the end head 28.

As shown in FIG. 2, the journal section 60 of the journal member 48 preferably includes a preferably cylindrical journal portion 64 for frictional engagement, a projecting stop surface preferably in the form of an annular step 66, a preferably externally threaded interference engagement portion 68, and a preferably cylindrical terminal portion 70. In the preferred embodiment, the cylindrical journal portion 64 defines an external, axially extending annular surface 64a which is received within the internal axially extending annular surface 36a defined by the preferably tapered frictional engagement portion 36 of the journal opening 34. The annular step 66 comprises an outwardly extending annular surface which abuts with an inwardly extending annular surface defining at least part of the annular shoulder 38 of the journal opening 34 and accordingly establishes the necessary axial positioning of the journal member 48 relative to the end head 28 and roll body 12. The externally threaded interference engagement portion 68 comprises threading in the form of screw threads 68a which threadingly engage and thereby releasably mate with screw threads 40a provided on the internally threaded portion 40 of the journal opening 34. The cylindrical terminal portion 70 is received, without significant radial clearance and preferably with only sliding contact, within the cylindrical support portion 42 of the journal opening 34. Thus, the location of the journal member 48 relative to the end head 28 is stabilized radially and pivotally by the engaged threads 68a and 40a and by the close fit of cylindrical terminal portion 70 in cylindrical support portion 42, even when the carrier roll 10 is subjected to relatively high transverse loads.

The bearing section 62 of the journal member 48 includes one or more bearing surfaces 72, 72'. Each such bearing surface 72, 72' may be, for example, a cylindrical surface having a diameter selected to be received within a bearing cartridge in the roll operating environment. A distance between the annular step 66 and a transverse center plane 74 or 74' of the bearing surface 72, 72', respectively, is selected in such a manner that the assembled roll 10 presents the same distance between bearing centers as the bearing cartridges in the roll operating environment.

The journal member 48 further comprises a threaded collar section 76 located axially between the journal section 60 and the bearing section 62. As shown in FIG. 3, the threaded collar section 76 is provided with at least one and preferably a plurality of axially extending, symmetrically located keyways uniformly spaced apart from one another like the pair of keyways 78, which are spaced uniformly 180 degrees apart.

The substantially annular tapered sleeve 50 is positioned radially between the tapered frictional engagement portion 36 of the journal opening 34 and the cylindrical frictional engagement journal portion 64 of the journal member 48. In the preferred embodiment, the substantially annular tapered sleeve 50 is a longitudinal split 51 extending the length of the member and may further include a plurality of other longitudinal splits uniformly spaced around the member and extending from the smallest O.D. end of the sleeve towards but not completely through its largest O.D. end. Sleeve 50 preferably includes a substantially frustoconical outer sleeve surface 80 and a cylindrical inner sleeve surface 82. The substantially frustoconical outer sleeve surface 80 frictionally engages the internal axially extending annular surface 36a defined by the tapered portion 36 of the journal opening 34 while the cylindrical inner sleeve surface frictionally engages the opposing cylindrical surface 64a of the journal member 48.

According to the preferred embodiment, lock washer 52 is carried on the threaded collar section 76 of the journal member 48. As shown in FIG. 4, the lock washer 52 preferably includes a radially inwardly extending tab 84, which engages with either one of the pair of axially extending keyways 78 provided in the threaded collar section 76. In an undeformed state, the lock washer additionally includes a plurality of outwardly extending tabs 86. The tabs 86 are preferably spaced circumferentially around the periphery of the lock washer at a predetermined uniform pitch.

The preferred threaded nut 54 shown in FIG. 5 comprises screw threads 88 which threadingly engage screw threads 76a provided on the threaded collar section 76 of the journal member 48. As shown in FIG. 1, the threaded nut 54 is positioned on the journal member 48 by being tightened onto the threaded collar section 76 to urge or force the tapered sleeve 50 axially inwardly and the substantially frustoconical outer sleeve surface 80 of annular tapered sleeve 50 into frictional engagement with the substantially frustoconical axially extending annular surface 36a provided for frictional engagement in the tapered portion 36 of the journal opening 34 and the cylindrical inner surface 82 into engagement with the cylindrically shaped annular surface 64a of the cylindrical journal portion 64 of the journal member 48. The forced engagement of the substantially annular tapered sleeve 50 with the tapered portion 36 of the journal opening 34 is, in the preferred embodiment, substantially self-locking due to the small angle of taper which characterizes the frustoconical surfaces, to sustain both torsional and axial loads. Moreover, this forced engagement functions to establish precise radial and angular positioning of the journal member 48 relative to the end head 28. The engagement of the internally threaded portion 40 of the journal opening 34 with the externally threaded portion 68 of the journal member 48 prevents the axial withdrawal of the journal section 60 of the journal member 48 from the journal opening 34, which might otherwise occur when the substantially annular tapered sleeve 50 is forced into engagement with the tapered portion 36 of the journal opening 34.

The preferred threaded nut 54 has a castellated periphery, as shown generally at 90 in FIG. 5. A plurality of radial grooves or notches 92 are formed at the periphery 90 of nut 54 defining respective castellations 94. The grooves 92 are preferably spaced circumferentially around the periphery 90 of the threaded nut 54 at a predetermined pitch different from the pitch of the tabs 86 on the lock washer 52.

The lock washer 52, in cooperation with at least one of the grooves 92 provided in the threaded nut 54, constitutes a locking assembly which locks the threaded nut 54 in position on the threaded collar section 76. Specifically, as shown in FIG. 1, one of the outwardly extending tabs 86 provided on the lock washer 52 is preferably deformed into registry with at least one of the grooves 92 formed in the castellated periphery of the threaded nut 54. The deformed tab 86 cooperates with the radially inwardly extending tab 84 to prevent rotation of the washer 52 and the threaded nut 54 relative to the threaded collar portion 76 of the journal member 48. While diametrically opposing keyways 78 and a single tab 84 are shown, it will be appreciated that greater number of tabs and keyways preferably uniformly spaced about the appropriate peripheries of section 76 and washer 52 may be provided. It is further conceivable that even a single keyway and tab might be accommodated, even though not preferred due to the imbalances that may be created by a single keyway.

It will thus be seen that the journal section 60 of journal member 48 and the journal opening 34 have three main sections, an end section, center section and front section. The end section, which comprises the cylindrical support portion 42 and cylindrical terminal portion 70, acts as a fulcrum, passing bending movements from the journal member into the end head and provides a large diameter access to the interior of the roll body 12 for balancing. The center section, which comprises the internally threaded portion 40 of the journal opening and externally threaded portion 68 of the journal member in combination with the stop surfaces provided by annular shoulder 38 and annular step 66, give accurate, known location for journal member and subsequently the bearing receiving the journal member. The front section, which includes the tapered portion 36 of the journal opening and the cylindrical journal portion 64 of the journal member with threaded collar section 76, achieves with the tapered sleeve 50, threaded nut 54 and lock washer 52, a fit similar to that of a conventional stick journal shrink fit. Unlike a stick journal, the fit is that can be easily removed by removing the sleeve.

In the preferred embodiment, shroud 56 covers the outer axial side 44 of the end head 28 and sealingly surrounds and engages a peripheral surface (e.g., bearing surface 96) of the journal member 48. The shroud 56 does not need to be engaged with the surface 96 and could be engaged elsewhere. The shroud 56 is attached in any conventional manner, e.g., by bolting to the end head 28 of the roll body 12, and is adapted to cooperate with a sealed housing 98 of bearing cartridge 22 for safety and to protect the various components of the journal assembly 18 from contact damage and adverse environmental conditions. Since the shroud is not load-bearing, it may be formed of relatively light material(s), such as molded plastic, to minimize any imbalance contribution it may make.

Labyrinth-type sealing elements 100 may be provided on the bearing cartridge housing 98 and on a remote axial end 102 of the shroud 56. The labyrinth-type sealing elements 100 form a seal between the bearing cartridge housing 98 and the shroud 56. An annular space 104 is formed (or delimited) between the shroud 56 and the end head 28. The annular space 104 is, in the preferred embodiment empty, a film or coating of a corrosion inhibiting substance, such as Cosmoline®, being applied to the parts. However, the space could be filled with another substance such as grease or petroleum jelly. The partial filling of the annular space 104 between shroud 56 and end head 28 preferably occurs either prior to the securing of the shroud 56 to the end head 28 while the axial outer side 44 of the end head 28 remains uncovered or after securement of the shroud 56 to the end head 28, e.g. by means of a grease fitting or the like (not depicted), which can be provided in the shroud 56.

The carrier roll 10 in the preferred embodiment is adapted to be mounted within various types of bearing cartridges. In one example depicted in FIG. 2, bearing cartridge 22 includes an adjustable bearing assembly indicated generally at 106, which surrounds bearing surface 72 provided on the bearing section 62 of the journal member 48. The adjustable bearing assembly 106 includes a roller bearing 108 having a conically tapered inner periphery 110. A tapered sleeve 112 is interposed radially between the bearing surface 72 and the conically tapered inner periphery 110 and is urged into engagement with the conically tapered inner periphery 110 by a threaded nut 116 and lock washer 118 carried on the bearing section 62. An additional radial ball bearing assembly 114 may be provided to support a second bearing surface 72' of the journal member, if desired or the second surface 72' and second bearing assembly 114 deleted. However, it will be apparent to those skilled in the art that the carrier roll 10 may used with other bearing cartridges, it merely being necessary to adapt the physical dimensions of a substitute journal member to the physical characteristics of the particular bearing cartridge.

The construction of the roll body 12 is generally as described above and in U.S. Pat. No. 4,920,627 incorporated by reference. Preferably each journal member is turned on a computer numeric control ("CNC") lathe, such as a Dainiche Model B-7, and the keyways 92 and one or more pairs of spanner flats 117 milled onto the turned shaft.

The construction of the rolls according to the present invention offer several advantages over the prior art. Specifically, the journal 48, which varies relatively little in diameter over its length, and is of a relatively minimal cross-sectional dimension, requires less machining than do journals of previous designs including those of U.S. Pat. No. 4,920,627. Costs for journals constructed according to this invention are estimated to exceed the costs of manufacturing conventional rolls with non-removable "stick" journals by less than ten percent. In contrast, cost of manufacture of rolls according to U.S. Pat. No. 4,920,627 exceeds such conventional roll manufacturing costs by much more than ten percent. These costs are believed to be capable of even greater reduction if sufficient demand is generated for continuous roll manufacture in economies of scale. Additionally, stress concentration factors, which arose in previous journals like those of U.S. Pat. No. 4,920,627 from the machining of bolt holes, from severe diametral changes and from the use of high bolt torsional loads, are eliminated or drastically reduced in the journal 48 while the transverse loads are being carried over greater areas, e.g. 64/36, 68/40 and 70/42, and greater shaft thicknesses. Virtually all the critical surfaces in the carrier roll 10 and on the journal 48, in particular, are rotational surfaces. This facilitates manufacturing to exacting tolerances and manufacturing the bearing members, in particular, in a single operation on a single machine. The relatively minimal outer diameters and symmetry of the journal members 48 tend to minimize any residual imbalance such journal members could provide. Ancillary parts of the journal assembly, such as the threaded nut 54, the lock washer 52, the substantially annular tapered sleeve 50, etc., are all generally axially symmetrical. Therefore, the imbalance in the carrier roll produced by these parts is negligible. The roll 10 is easily taken apart and reassembled. The journal assemblies are easily replaced with identical or different assemblies and with virtually no distortion of the bearing members and end heads, thereby reducing the possibility of deleteriously affecting the balance of the individual components.

According to the preferred embodiment of the invention, the assembling of the journal assembly 18 to the roll body 12 occurs in the following manner. The roll body 12 and individual journal member(s) 18 are manufactured. Neither is balanced during or after manufacturing or during assembly. One journal member 48 is inserted into the journal opening 34 provided in the axial end 14 or roll body 12 in its end head 28. A like journal is installed in the other axial end of the roll body 12. The externally threaded portion 68 of the journal member 48 is screwed into the internally threaded portion 40 of the journal opening 34 until the stop surface formed by annular step 66 on the journal member abuts the annular shoulder 38 provided in the journal opening. This provides precise axial positioning of the journal member 48 and its bearing surface centers 74, 74' relative to the end head 28. Interference engagement of the threads prevents axial withdrawal of the member 48 from opening 34 and retains contacting surfaces of the annular step 66 and annular shoulder 38 in abutment. A wrench may be applied to flats 117, if necessary.

The tapered sleeve 50 is then inserted between the cylindrical journal portion 64 of the journal member 48 and the substantially frustoconical portion 36 of the journal opening 34. The tapered outer surface 80 of tapered sleeve 50 is urged into engagement with the tapered annular surface 36a of tapered portion 36 of the journal opening 34, while the cylindrical inner surface 82 is pressed into engagement with cylindrical journal portion 64, whereby a precise radial and angular positioning of the journal member 48 relative to the end head 28 is established. The urging of the tapered sleeve 50 into engagement with the tapered portion 36 of the journal opening 34 is accomplished by mounting the threaded nut 54 onto the threaded collar section 76 of the journal member 48 and screwing the nut towards the tapered sleeve 50. Once the threaded nut 54 has been tightened sufficiently, the threaded nut 54 is locked in place by deforming one of the tabs 86 of the lock washer 52 in registry with one of the groove(s) 92 formed in the periphery 90 of the threaded nut 54 into the groove.

The bearing assembly components are covered with the protective coating or film of a corrosion inhibiting substance (or space 104 filled with a comparable protective material) and shroud 56 is secured to the end head of the roll body 12 so as to sealingly surround the journal member 48 and form the annular space 104 between the shroud 56 and the end head 28. It will also be apparent that the assembly of a complete roll 10 according to the preferred embodiment merely entails the attachment of two journal assemblies to the two opposing axial ends of the roll body 12.

Disassembling of the journal assembly 18 from the roll body 12 (e.g. for purposes of repair, etc.) occurs in substantially a reverse order as the assembling method described above. In particular, the removing of the journal member 48 from the journal opening is preferably accomplished by unlocking the locking assembly, constituted by the lock washer 52 in one of the grooves 92 and the threaded nut 54, so as to permit removal of the threaded nut 54 from the journal member 48, and removal of the tapered sleeve 50 from between the journal member 48 and the journal opening 34. The tapered sleeve 50 is preferably provided with external threads 50a. A conventional withdrawal sleeve can be applied to the journal member 48 after the nut 54 and lock washer 52 have been removed to draw the tapered sleeve 50 out from between the tapered portion 36 with the journal opening 34 and cylindrical journal portion 62 of the journal member 48 using the external threads 50a. Thereafter, the journal member 48 is unscrewed from the journal opening 34.

The roll 10 according to the preferred embodiment may be advantageously balanced to within a predetermined Balance Quality Grade such as G-2.5 or, more preferably, G-1.0 or better (smaller) residual imbalance value as defined in Acoustical Society of America Standard 2-1975 for "Balance Quality of Rotating Rigid Bodies", incorporated by reference herein.

The balancing of the carrier roll 10 is accomplished as follows. Manufacture of the roll body 12 is generally as described above and in U.S. Pat. No. 4,920,627. It is presently believed possible referred to maintain the residual imbalance value of each of the components of the journal assemblies, particularly the bearing members, as well as the roll body within a Balance Quality Grade of G-0.4 or better. This can be accomplished, in part, by accurately machining the journal members and by the use of high quality bearing assembly parts such as those of SKF Industries of King of Prussia, Pa. For example, according to the manufacturer, the Dainiche Model B-7 CNC lathe was designed to provide roundness to within one-half mil (0.012 mm) and a total indicator reading (T.I.R.) of within 0.7 mil (0.018 mm) and, when properly installed, has actually provided roundnesses of one-tenth of a mil (0.003 mm) and T.I.R.s of 0.4 mil (0.010 mm). Four inch diameter bearing members 48, which weighed between about 20 and 30 kg and which were turned on a Dainiche B-7 CNC lathe, have exhibited residual imbalances unmeasurable on dynamic balancing equipment having a sensitivity as low as 10 gram-inches.

Once manufacture of the roll body and journal members has been completed, the roll assemblies are mounted to a roll body without prebalancing any of the components and the resulting roll is dynamically balanced as an assembly with its journals to within its permitted predetermined residual imbalance value. The roll body 12 without cover is mounted on a dynamic balancing machine such as a Hard Bearing Balancing machine by Schenk Treble, which measures the residual static and dynamic imbalance of the roll 10. The machine then determines at which particular position(s) on an internal surface S of the roll body 12 particular balance weight(s) is (are) required to be secured in order to bring the residual imbalance of the roll body 10 to within the predetermined permitted imbalance value. The roll 10 is demounted from the dynamic balancing machine, one of its journal members 48 removed and a balance weight is passed through the journal opening 34 and secured to the internal surface S of the roll body 12 preferably by drilling a hole through the roll body 12 at the particular position. The balance weight is positioned on the internal surface S of the roll body 12 at the particular position so that a threaded hole provided in the balance weight is aligned with the drilled hole in the roll body 12. A threaded fastener is then passed through the drilled hole and screwed into the threaded hole in the balance weight so as to fasten the balance weight to the internal surface S of the roll body 12. The original journal assembly or a replacement assembly is then remounted and the residual imbalance level verified by dynamic balancing of the roll again as described above.

For journal members 48 manufactured by high quality CNC lathes or comparable equipment, in the journal member configuration disclosed, it is believed that the residual imbalance value of each roll body 12 and each pair of roll assemblies 22 can be held to within a Quality Grade of G-0.4 or better (less), if the entire roll 10, is dynamically balanced by the above method to within a Quality Grade of G-1.0. Where the roll 10 is to be covered, the uncovered roll can be balanced as above, the cover applied and cured and the roll with cover trim balanced dynamically. In addition, consideration should be given to dynamically straightening as well as dynamically balancing such hollow tube industrial rolls, particularly where higher rotational speeds or greater length to width ratios are sought. See K. H. Schminke, "Die Bedentung des Auswuchtens bei schnellaufenden Papiermaschinen", *Das Papier*, 45 Jahrgang, 7/91, incorporated by reference herein.

One will appreciate that all of the desirable objects set forth at the end of Background of the Invention section above are satisfied by at least the described preferred embodiments of the present invention. The design has numerous additional advantages. For example, the design allows on-site replacement of damaged journals, in many cases without the necessity of even having to remove the roll of the machine, saving significant repair time. The design allows different journals to be fitted to any given roll body, given a choice of bearing centers or styles of bearing arrangement. This will allow a common roll body to be fitted with a variety of different journals for varied locations without the need to stock a specific spare roll for each location. The present design aids in the manufacture of rolls that are flexible and require critical straightening and balancing as such rolls can be fully checked by running on their journals in a dynamic balancer. Balance weights and positions can then be determined, one of the journal removed, the balance weights attached, the journals refitted while balance of the roll is maintained. Unlike the prior replaceable journal design, the present design can be used in any roll and is not limited, for example, to the sizes of the paper making rolls described in U.S. Pat. No. 4,920,627, but may be larger or smaller, heavier or lighter. The present invention can be used with rolls subject to significant transverse loads, such as nip, press and calendar rolls. In limited testing to date, a 4.5 inch diameter journal withstood 1760 ft.-lbs. of torque before slipping. It has been found that slipping torque is directly proportional to torque applied to the threaded nut 54. It is believed that six basic joints sizes ranging from 3.5" to 8" will be adequate for all tube-type carrier rolls ranging from 6" up to 24" in diameter and from paper rolls through felt rolls to breast rolls with faces ranging from 60" up to 430" in length. The journal member/rotational body coupling is also believed applicable for any journal-type roll application and further for other industrial rotational body applications such as but not limited to replaceable journals on reel spools.

While a preferred journal member/roll body engagement has been described, it will be appreciated that alternate engagements and modified engagements might also be successfully employed. For example, the end of the journal/roll body engagement provided by journal support portion 42 of the journal opening 34 and terminal portion 70 of the journal member 48 might both be eliminated where transverse loading of the roll permits. While mutually engaging threading is preferred for the interference coupling between the opening 34 and journal member 48, other conventional interference engagements which are also at least generally axially symmetric might be employed. These include but are not limited to bayonet and breach locking type mechanisms and more sophisticated arrangements including, but not limited to radially spreadable panels or engagement members. Threading is preferred both in terms of the extent of the area of engagement and full range of adjustment which is provided. Lastly, while a sleeve with tapered outer surface and cylindrical inner surface is shown and preferred, other combinations including tapered outer and tapered inner surfaces and cylindrical outer and tapered inner surfaces could also be used. While the urging member locking assembly is mounted to the bearing member, it may be threadingly coupled with the end of the roll body urging a tapered sleeve into engagement with a tapered surface along the bearing member. While one piece of tapered sleeves are shown, it will be appreciated that multi-piece sleeves might also be employed, through not preferred.

While a press or shrink fit engagement between the tubular shell and end heads of the roll body has been described, other configurations and methods of joining the end heads with the roll shells may be employed. For example, FIG. 6 depicts, diagrammatically, one possible arrangement more suited for use with large diameter rolls. In FIG. 6, a rotationally symmetric end head 128 is mounted to the outer end of cylindrical shell 124 and radially centered by means of a tapered sleeve 150 which is urged into position, being pulled toward the outer side of the end head by an urging bolt 154. The end head 128 is fixed axially and rotationally in place by engagement members passed between the end head and the shell itself, preferably a plurality of bolts, one of which is indicated at 160.

It will be appreciated that conventional rolling bearing mounting and dismounting tools may also be used to assure that adequate urging forces are applied to the tapered sleeve 50 to assure good fit. For example, hydraulic mounting and dismounting tools from sources such as SKF, might be employed to both initially mount and to remove a tapered sleeve.

From the foregoing description, it can be seen that the present invention provides an improved journal member and mount for rolls and other rotational members that provide numerous advantages over existing construction. It will recognized by those skilled in the art that changes could be made to the above-described embodiments of the invention without departing from the broad inventive concepts thereof. It is to be understood, therefore, that the present invention is not limited to the particular embodiment disclosed, but rather is intended to include all modifications and changes which are within the scope and spirit of the invention as defined by the appended claims.

I claim:

1. Apparatus comprising:

a body at least generally symmetric about an axis of rotation and including an end portion having a journal opening therein extending along the axis of rotation and a journal stop surface, the journal opening defining an internal axially extending annular surface;

a journal member supported within the journal opening with one axial end of the journal member disposed within the body, the journal member including a journal section and a bearing section, the journal section extending into the journal opening, the bearing section being disposed outwardly of the journal opening and extending axially away from the body, the journal section including a stop surface abutting the journal stop surface of the body and an external axially extending annular surface, at least one of the internal axially extending annular surface and the external axially extending annular surface defining a substantially frustoconical journal surface;

a substantially annular sleeve releasably interposed radially between the internal axially extending annular surface in the journal opening and the external axially extending annular surface on the journal section, the substantially annular sleeve including at least one substantially frustoconical sleeve surface opposing the at least one substantially frustoconical journal surface; and an urging member mounted to one of the body and the journal member so as to urge the at least one substantially frustoconical sleeve surface into engagement with the substantially frustoconical journal surface so as to maintain the journal stop surface and the stop surface abutted.

2. The apparatus as recited in claim 1, wherein the end portion of the body comprises an end head located in a hollow cylindrical shell and the journal member comprises a stub shaft, and wherein the one axial end of the journal member is disposed at a position inside the end head.

3. The apparatus as recited in claim 2, wherein the end head is located in one axial end of the body and wherein the journal opening extends through the end head into a hollow interior of the shell.

4. The apparatus as recited in claim 1, wherein an interference engagement portion of the journal section of the journal member is releasably interferingly engaged with a complementary interference engagement portion of the journal opening so as to hold the journal stop surface and the stop surface abutted.

5. The apparatus as recited in claim 1, wherein an internally threaded portion is provided in the journal opening and wherein the journal section of the journal member includes an externally threaded portion releasably threadingly engaged with the internally threaded portion.

6. The apparatus as recited in claim 5, wherein the journal stop surface is provided by an annular shoulder provided in the journal opening and wherein the stop surface of the journal member is provided by an annular step abutting against the annular shoulder.

7. The apparatus as recited in claim 6, wherein the journal section includes an axially extending cylindrical terminal portion slidingly received within an axially extending cylindrical support portion provided in the journal opening.

8. The apparatus as recited in claim 1, wherein the journal section includes an axially extending cylindrical terminal portion slidingly received within an axially extending cylindrical support portion provided in the journal opening.

9. The apparatus as recited in claim 1, wherein the journal member further includes a threaded collar section adjacent to the journal section, and wherein the urging member is a threaded nut engaged with the threaded collar section.

10. The apparatus as recited in claim 9, wherein the threaded nut includes a castellated periphery and the threaded collar section includes at least one axially extending keyway, and the apparatus further comprising a lock washer carried on the threaded collar section, the lock washer including at least one radially inwardly extending tab positioned in the at least one keyway and at least one additional tab engaged with at least one radial groove in the castellated periphery of the threaded nut.

11. The apparatus as recited in claim 1, wherein the annular sleeve has external threading at one axial end located farthest from the stop surface and the journal stop surface.

12. An industrial roll comprising:

a roll body including an end portion having an journal opening therein and a journal stop surface, the journal opening including a frictional engagement portion and an interference engagement portion;

a journal member supported within the journal opening, the journal member including a journal section extending into the journal opening and terminating within the roll body and a bearing section disposed outwardly of the journal opening and extending axially away from the roll body, the journal section comprising a frictional engagement journal portion received within the frictional engagement portion of the journal opening, a stop surface abutting the journal stop surface and an interference engagement portion engaging the interference engagement portion of the journal opening;

a substantially annular sleeve releasably interposed between the frictional engagement portions of the journal opening and the journal member, the substantially annular tapered sleeve comprising at least one substantially frustoconical sleeve surface engaging a complementary substantially frustoconical surface provided on at least one of the frictional engagement portions of the journal opening and the journal member; and an urging member carried on one of the journal member and the roll body urging the substantially frustoconical sleeve surface into releasable engagement with the substantially frustoconical frictional engagement surface.

13. The roll as recited in claim 12, wherein the interference engagement portions of the journal opening and the journal member respectively comprise an annular shoulder in the journal opening, and an annular step on the journal member abutting against the annular shoulder.

14. The roll as recited in claim 13, wherein at least part of the interference engagement portion of the journal opening is internal threading and wherein at least part of the interference engagement portion of the journal member is external threading engaged with the internal threading of the journal opening.

15. The roll as recited in claim 12, wherein at least part of the interference engagement portion of the journal opening is internally threading and wherein at least part of the interference engagement portion of the journal member is externally threading engaged with the internal threading of the journal opening.

16. The roll as recited in claim 12, wherein the journal section of the journal member includes a cylindrical terminal portion which is received within a hollow cylindrical support portion provided in the journal opening.

17. The roll as recited in claim 12, wherein the journal member includes a threaded collar section adjacent to the journal section, and wherein the urging member comprises a threaded nut threaded on the threaded collar section.

18. The roll as recited in claim 17, wherein the threaded nut includes a castellated periphery and the threaded collar section includes at least one keyway and wherein the apparatus further comprises a lock washer carried on the threaded collar section, the lock washer including at least one radially inwardly extending tab engaged with the at least one keyway provided on the threaded collar section and at least one additional tab engaging at least one radial groove formed in the castellated periphery of the threaded nut.

19. A method of connecting a journal member to an end of a rotational body, the journal member comprising a stub shaft including a bearing section and a journal section, the journal section including a stop surface and an interference engagement journal portion, and wherein the end of the body is provided with a journal opening which includes an interference engagement portion complementary to the interference engagement portion of the journal member and a journal stop surface, comprising the steps of:

inserting the journal member into the journal opening in the rotational body end;

releasably engaging the interference engagement portion of the journal member with the interference engagement portion of the journal opening so as to hold the journal stop surface on the journal member in abutment with the journal stop surface of the roll body; and securing the journal member from further movement with respect to the journal opening.

20. The method as recited in claim 19, wherein the engaging step comprises rotating the journal member in the journal opening with respect to the rotational body.

21. The method as recited in claim 19, wherein the engaging step comprises screwing an externally threaded portion of the journal section into an internally threaded portion of the journal opening.

22. The method as recited in claim 19, wherein at least one of the journal opening and the journal section further includes a tapered portion and wherein the securing step further comprises the steps of:

inserting a tapered sleeve between the journal member and the journal opening; and urging the tapered sleeve into engagement with at least the tapered portion of one of the journal opening and the journal section.

23. The method as recited in claim 19, wherein the journal member includes a threaded collar section adjacent the cylindrical journal portion, and wherein the urging step further comprises:

screwing a threaded nut onto the threaded collar section of the journal member so as to urge the tapered sleeve into engagement with the tapered portion in the journal opening; and locking the threaded nut in place on the threaded collar section of the journal member.

24. The method as recited in claim 19, wherein the rotational body and journal member are joined together for rotation through the inserting, engaging and securing steps without the journal member or the rotational body being dynamically balanced and further comprising the steps of:

rotating the rotational body and the journal member together on a dynamic balancing machine;

removing the journal member from the rotational body;

modifying dynamic balance of only the rotational body; and rejoining the rotational body with the journal member by the inserting, engaging and securing steps, all while maintaining an original state of dynamic balance of the journal member.

25. A method of connecting a journal member to an end of a body at least generally symmetric about an axis of rotation and including an end portion having a journal opening therein extending along the axis of rotation and a stop surface, the journal opening defining an internal axially extending annular surface and including an interference engagement portion; the journal member being supported within the journal opening with one axial end of the journal member disposed within the body, the journal member including a journal section and a bearing section, the journal section extending into the journal opening and the journal section having an interference engagement portion, the bearing section being disposed outwardly of the journal opening and extending axially away from the body, the journal section including a stop surface abutting the stop surface of the body and an external axially extending annular surface, at least one of the internal axially extending annular surface and the external axially extending annular surface defining a substantially frustoconical journal surface; a substantially annular sleeve releasably interposed radially between the internal axially extending annular surface in the journal opening and the external axially extending annular surface on the journal section, the substantially annular sleeve including at least one substantially frustoconical sleeve surface opposing the at least one substantially frustoconical journal surface; and an urging member mounted to one of the body and the journal member so as to urge the at least one substantially frustoconical sleeve surface into engagement with the substantially frustoconical journal surface so as to maintain the journal stop surface and the stop surface abutted, comprising the steps of:

inserting the journal member into the journal opening in the body end;

releasably engaging the interference engagement portion of the journal member with the interference engagement portion of the journal so as to hold the stop surface of the journal member in abutment with the stop surface of the body; and securing the journal member from further movement with respect to the journal opening.

\* \* \* \* \*